United States Patent
Kawaguchi et al.

(10) Patent No.: US 7,742,456 B2
(45) Date of Patent: Jun. 22, 2010

(54) SYSTEM AND METHOD FOR LOCATIONING IN A COMMUNICATIONS NETWORK

(75) Inventors: Dean Kawaguchi, San Jose, CA (US); Vinh-Phuong Tra Le, Fremont, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 351 days.

(21) Appl. No.: 11/266,929

(22) Filed: Nov. 4, 2005

(65) Prior Publication Data

US 2007/0104157 A1    May 10, 2007

(51) Int. Cl.
*H04W 4/00* (2009.01)
(52) U.S. Cl. ........................................ 370/338
(58) Field of Classification Search ................. 370/331, 370/332, 338; 455/404.2, 456.1
See application file for complete search history.

(56) References Cited

U.S. PATENT DOCUMENTS

| | | | |
|---|---|---|---|
| 6,388,618 B1 | 5/2002 | Stilp et al. | |
| 6,603,961 B1 * | 8/2003 | Kuroda | 455/133 |
| 6,757,545 B2 * | 6/2004 | Nowak et al. | 455/456.2 |
| 7,142,147 B2 * | 11/2006 | Holly | 342/13 |
| 7,205,938 B2 * | 4/2007 | Davi et al. | 342/451 |
| 7,233,800 B2 * | 6/2007 | Laroia et al. | 455/456.1 |
| 7,272,385 B2 * | 9/2007 | Mirouze et al. | 455/414.1 |
| 7,286,833 B2 * | 10/2007 | Friday et al. | 455/456.1 |
| 7,440,728 B2 * | 10/2008 | Abhishek et al. | 455/41.2 |
| 2004/0023674 A1 * | 2/2004 | Miller | 455/462 |
| 2004/0102198 A1 * | 5/2004 | Diener et al. | 455/456.1 |
| 2004/0198386 A1 * | 10/2004 | Dupray | 455/456.1 |
| 2005/0007278 A1 | 1/2005 | Anson et al. | |
| 2006/0128311 A1 * | 6/2006 | Tesfai | 455/67.11 |
| 2006/0182064 A1 * | 8/2006 | Durand et al. | 370/332 |
| 2007/0268880 A1 * | 11/2007 | Bellur et al. | 370/338 |

FOREIGN PATENT DOCUMENTS

WO    2005/004447    1/2005

* cited by examiner

*Primary Examiner*—Lester Kincaid
*Assistant Examiner*—Nathan Mitchell

(57) ABSTRACT

Described is a method for locationing in a communications network. A wireless access point receives a signal corresponding to activity of a plurality of wireless devices on a predetermined bandwidth. The signal is processed to generate a plurality of subsignals using a predetermined signal processing procedure. An energy level of a particular subsignal of the plurality of subsignals is determined. A location of a corresponding wireless device is determined as a function of the energy level and a predetermined locationing procedure.

19 Claims, 2 Drawing Sheets

SYSTEM AND METHOD FOR LOCATIONING IN A COMMUNICATIONS NETWORK

BACKGROUND

In a conventional wireless network, a location of a mobile unit ("MU") may be determined using, for example, a triangulation process. The triangulation process requires input data from the MU and at least three access points ("APs"). The input data is typically a received signal strength indicator ("RSSI") generated from communication of radio frequency ("RF") signals between the MU and the APs. To generate the input data, each of the three APs must be listening to the MU on a same RF channel utilized by the MU. Requiring the input data from three APs using the same channel significantly limits locationing of unauthorized devices (e.g., rogue APs, intruders) and/or devices causing interference (e.g., Bluetooth® transmitters, cordless phone/speakers, microwave ovens). Thus, there is a need for a locationing system which may identify and locate authorized and unauthorized devices.

SUMMARY OF THE INVENTION

The present invention relates to a method for locationing in a communications network. A wireless access point receives a signal corresponding to activity of a plurality of wireless devices on a predetermined bandwidth. The signal is processed to generate a plurality of subsignals using a predetermined signal processing procedure. An energy level of a particular subsignal of the plurality of subsignals is determined. A location of a corresponding wireless device is determined as a function of the energy level and a predetermined locationing procedure.

DETAILED DESCRIPTION

Figure 1:
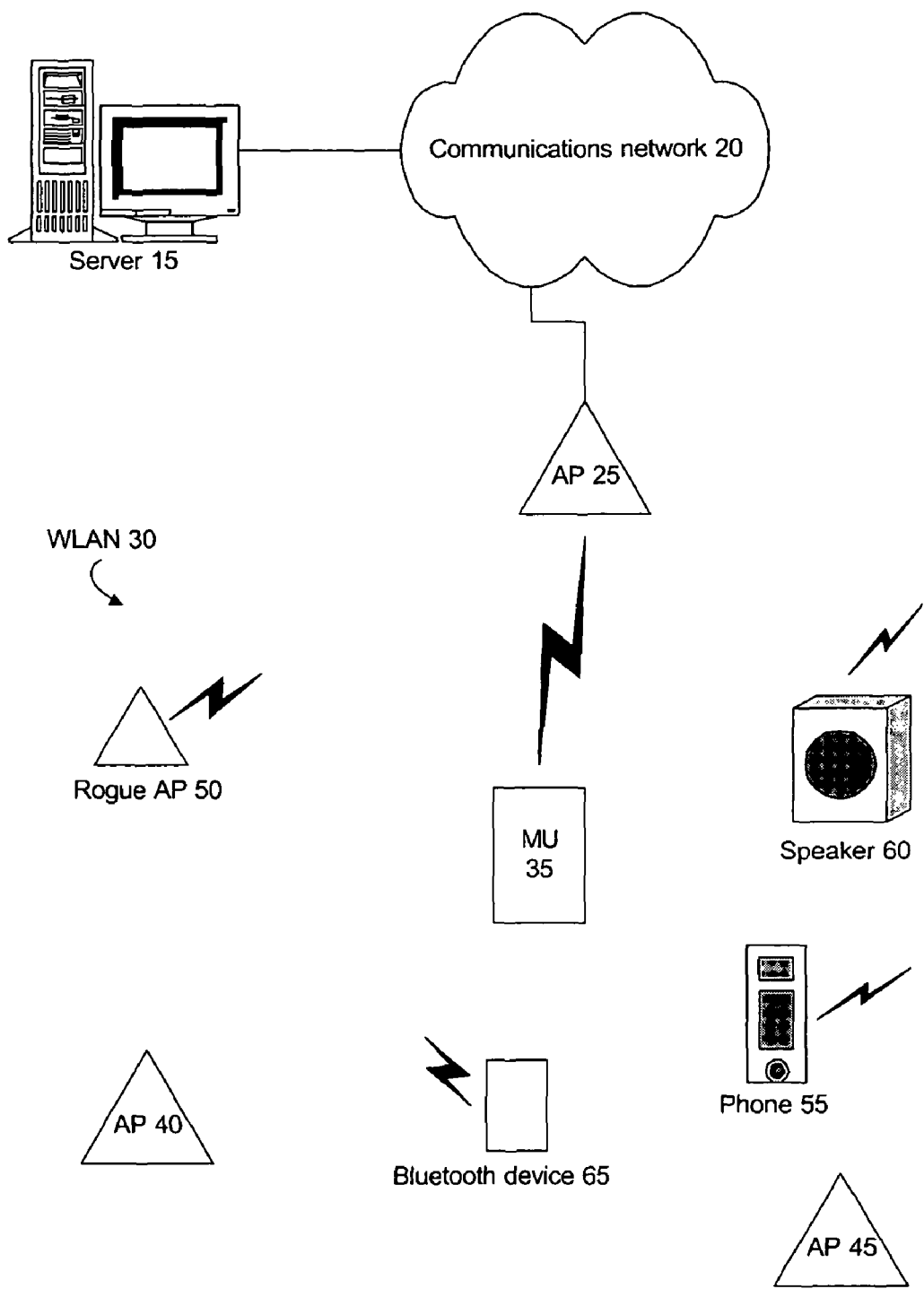
FIG. 1 shows an exemplary embodiment of a system according to the present invention.

The present invention may be further understood with reference to the following description and the appended drawings, wherein like elements are referred to with the same reference numerals. The present invention describes a system and a method for locationing in a communications network. In an exemplary embodiment, a location of a wireless device may be determined by, for example, analyzing a frequency band. The frequency band may be, for example, a 2.4 GHz band and/or a 5.1 GHz band which are conventionally used for wireless communications in the network. However, those of skill in the art will understand that the present invention may be applied to further frequency bands in a radio frequency ("RF") spectrum.

FIG. 1 shows an exemplary embodiment of a system 10 according to the present invention. The system 10 may include a server 15 coupled to a communications network 20 (e.g., LAN, WAN, Internet, etc.). The server 15 may include a data storage arrangement and/or be coupled to a stand-alone database (not shown). The network 20 may include one or more network computing devices (e.g., a switch, a router, a hub, etc.) which transmit, receive and process data requests from devices coupled thereto.

An access point ("AP") 25 is coupled to the network 20. The access point 25 may be one exemplary device operating in a wireless network (e.g., a wireless local area network ("WLAN") 30). That is, the WLAN 30 may include a first set of devices which are authorized to access and communicate on the WLAN 30. For example, a mobile unit ("MU") 35 may be associated with the AP 25, communicating therewith according to a predetermined wireless communication protocol (e.g., an 802.11 protocol). Those of skill in the art will understand that they MU 35 may include a cell phone, a laptop, a network interface card, an image/laser based scanner, an RFID reader, etc.

Further included in the first set may be APs 40 and 45, which may also communicate according to the predetermined wireless communication protocol. Those of skill in the art will understand that the first set of devices may include any number and/or type of devices which utilize the predetermined wireless communication protocol. As further understood by those of skill in the art, the AP 25 may communicate with the MU 35 on a first RF channel, whereas the APs 40 and 45 operate on a second RF channel and a third RF channel, respectively. This is typically done so that communication between the MU 35 and the AP 25 does not cause interference on the second and third channels, because the APs 25, 40 and 45 may be in a predetermined range relative to each other whereby operation on a same channel (e.g., the first channel) may cause interference, congestion, etc.

Disposed within a physical area covered by the WLAN 30 may be a second set of devices which are unauthorized to access the WLAN 30 and/or cause interference during operation of the first set of devices. For example, as shown in FIG. 1, the second set of devices may include, but is not limited to, a rogue AP 50, a cordless phone 55, a cordless speaker 60 and a Bluetooth® device 65. Those of skill in the art will understand that the rogue AP 50 may be an unauthorized device on the WLAN 30 which may use a bandwidth dedicated to the WLAN 30 and/or be a malicious device attempting to compromise a security of the WLAN 30. However, the phone 55, the speaker 60 and the Bluetooth® device 65 may be devices which are authorized to operate, but whose operation causes interference with, for example, the MU 35. This may be problematic when the MU 35 is executing an application, such as a VoIP session, which requires a quality-of-service.

Figure 2:
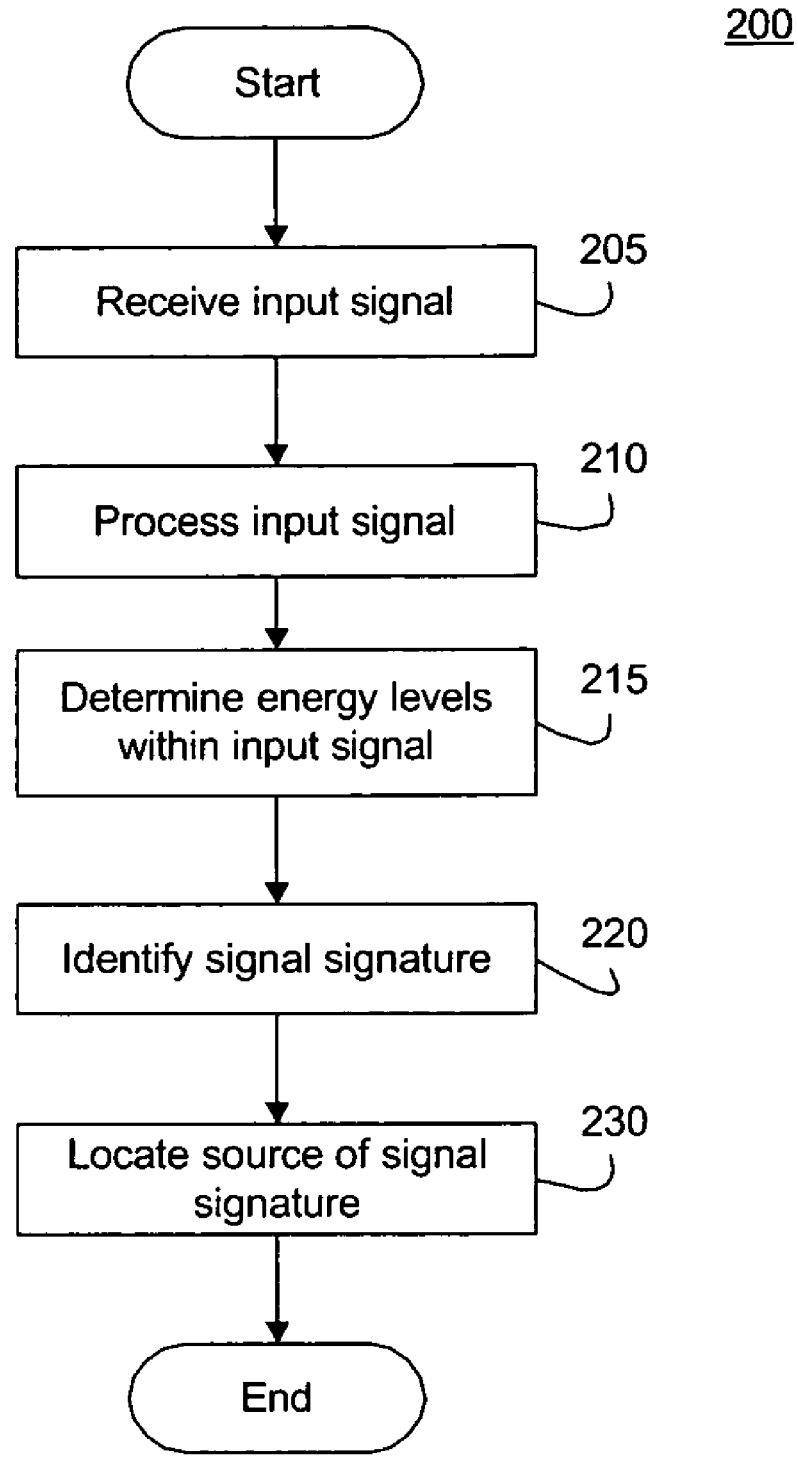
FIG. 2 shows an exemplary embodiment of a method according to the present invention.

FIG. 2 shows an exemplary embodiment of a method 200 for locationing in a communications network according to the present invention. From the analysis of the frequency band by one or more of the APs 25, 40 and 45, a location of a device in the first set may be determined. In another exemplary embodiment, it may be determined whether any device in the second set is transmitting signals within the WLAN 30. If so, a location of the device(s) may be determined, and a predetermined action may be taken with respect thereto.

In step 205, the AP 25 receives an input signal. In one embodiment, the input signal is an entire frequency band. For example, the input signal may have a predetermined width (e.g., 80 MHz) which would take in the entire frequency band (e.g., a 2.4 GHz band). According to the present invention, the AP 25 and every other AP in the WLAN 30 may utilize one or more chipsets which allow the corresponding AP to receive the entire frequency band or multiple frequency band simultaneously. Those of skill in the art will understand that the chipset(s) may allow the AP 25 to receive the entire frequency band of the 5.1 GHz band and any other frequency band in the RF spectrum. In operation, the AP 25 may continuously receive the input signal.

In step 210, the AP 25 processes the input signal using, for example, a signal processing technique (e.g., a Fast Fourier Transform ("FFT")). The FFT may be executed on the input signal at a predetermined interval (e.g., every 5 µs). The FFT divides the input signal into a predetermined number of bins having a predetermined resolution. Each bin includes a portion of the input signal as wide as the predetermined resolution. For example, if the input signal is 80 MHz wide and is divided into 64 bins, each bin will have a resolution of 1.25 MHz. Thus, the portion of the signal in each bin may be 1.25 MHz wide.

In step 215, an energy level of each bin is determined by analyzing a predetermined characteristic (e.g., an amplitude) of the portion of the signal therein. For example, the amplitude of the portion of the signal may be indicative of the energy level thereof. Those of skill in the art will understand that the energy level may be directly proportional to an activity level generated by a source of that portion of the signal. For example, when the MU 35 is transmitting wireless signals, the energy level may be greater than when the MU 35 is idle.

In step 220, the AP 25 identifies a signal signature within one or more of the bins. The signal signature may be one or more characteristics (e.g., a frequency hop pattern, an amplitude dip, etc.) which uniquely identifies the portion of the signal in the bin. For example, if the portion of the signal is rounded, it may correspond to a complementary code keying ("CCK") code word. If the portion of the signal is squared, it may correspond to an orthogonal frequency division multiplexing ("OFDM") signal (e.g., an 802.11g signal). Thus, in one embodiment, the AP 25 may identify the signal signature (s) which correspond to signals communicated according to the predetermined wireless protocol ("802.11 signals"). Further, those of skill in the art will understand that the AP 25 may analyze a predetermined number of bins over a predetermined time period prior to determining the signal signature. For example, the OFDM signal may be about 16 MHz wide, and thus, at 1.25 MHz resolution, the AP 25 may analyze about 12 bins prior to identifying the signal signature of the OFDM signal.

When the signal signature corresponds to the 802.11 signal, the AP 25 may demodulate the signal to determine a source and a destination thereof. That is, a header of the signal may include identifiers indicative of the source and the destination. Using the identifiers, the AP 25 may determine whether the source and/or the destination have been authenticated and are authorized to operate on the WLAN 30. For example, the identifier be indicative of the MU 35 which has been authorized on the WLAN 30, whereas one of the identifiers may correspond to a device which has not been authenticated (e.g., the rogue AP 50).

The AP 25 may further identify the signal signature(s) corresponding to signals not communicated according to the predetermined wireless protocol ("non-802.11 signals"). For example, the signal signatures corresponding to activity of the speaker 60 and the phone 55 may be identified as the non-802.11 signals. These non-protocol signals may be identified in one or more bins, because they are typically about 1 MHz wide.

In step 225, the AP 25 locates a source of the signal signature. For example, when the signal signature of the MU 35 is identified in step 225, the AP 25 recognizes that the MU 35 is authorized to operate on the WLAN 30 and may determine the location thereof. In another exemplary embodiment, the AP 25 may not locate the source of the signal signature which corresponds to 802.11 signals communicated by an authenticated and authorized device. However, as will be described further below, the AP 25 may locate the source of unauthorized 802.11 signals (e.g., the rogue AP 50).

The AP 25 may attempt to locate the sources of the 802.11 signals and/or the non-802.11 signals. In one embodiment, the AP 25, a network device (e.g., a switch, router, etc.) and/or the server 15 may execute a locationing procedure (e.g., triangulation) using location data from at least three APs (e.g., the APs 25, 40 and 45) which have detected the energy levels. That is, the APs 40 and 45 may have executed the method 200 and identified the energy levels and the bins corresponding thereto. Thus, the location data from the APs 25, 40 and 45 may be used to triangulate the location of the source of the signal signature. In this manner, any device transmitting on the frequency band may be located.

When the source of the signal signature has been located, a network administrator may execute a predetermined action. For example, when the source is the rogue AP 50, the administrator may disable it by removing power and/or switching off a radio thereof. When the source is the phone 55 and/or the speaker 60, the administrator may determine whether the operation thereof may continue. For example, if the speaker 60 is used as part of a public address system and was broadcasting an announcement signal when the input signal was received and processed, the energy generated thereby may have crossed the predetermined threshold. However, upon locating the speaker 60, the administrator may determine that the speaker 60 operates only intermittently, and, as such, may only cause interference which is tolerable during network operation.

In another exemplary embodiment, after determining the energy levels of the bins, the AP 25 determines whether any of the energy levels are unexpected. For example, the AP 25 may determine whether the energy level in each bin is greater than a predetermined threshold level. The threshold level may correspond to a predetermined network condition, such as, a level at which interference with the WLAN 30 may occur. For example, if the Bluetooth device 65 was continuously transmitting and/or transmitting at a high energy level, the energy level of the bin which is indicative of signals from the Bluetooth device 65 may surpass the threshold level. Also, if the AP 25 is communicating with the MU 35, the energy levels of the bins corresponding to each may surpass the threshold level. Additionally and/or alternatively, the AP 25 may compare the energy level in each bin to stored energy levels which have been previously recorded. In this manner, the AP 25 may identify those bins with energy levels different (or within a predetermined range) of the stored energy levels.

From the above description, those of skill in the art will understand that the present invention provides an advantage of locating the source of any signal (e.g., 802.11 and non-802.11) transmitted on the frequency band. As described above, the source of the signal may be an unauthorized device accessing the WLAN 30 and/or a device which is authorized, but causes interference with operation of devices on the WLAN 30. Thus, when the source is located, the network administrator may determine whether the source should be disabled (e.g., powered off), reconfigured (e.g., decrease power settings, frequency change) or remain in operation.

It will also be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
   providing a wireless access point configured to communicate to a plurality of mobile units through a wireless communication protocol and further configured to receive a frequency band in addition to communicating to the plurality of mobile units;

receiving, by the wireless access point, a signal encompassing multiple activities occurring at the same time from a plurality of wireless devices operating on multiple different frequencies within the frequency band having a predetermined bandwidth, the multiple activities being received simultaneously by the wireless access point;

processing the signal to generate a plurality of subsignals using a predetermined signal processing procedure;

determining an energy level of a particular subsignal of the plurality of subsignals;

identifying a signal signature of the particular subsignal, the signal signature being indicative of a corresponding wireless device of a local area network;

responsive to identifying the signal signature of the wireless device of the local area network, demodulating the signal to determine a source and a destination associated with the signal;

determining whether the source and the destination each comprise authorized devices; and determining a location of the corresponding wireless device as a function of the energy level and a predetermined locationing procedure, wherein the location of the corresponding wireless device is determined only when the energy level is greater than a predetermined threshold level corresponding to a predetermined network condition.

2. The method according to claim 1, wherein the corresponding wireless device includes one of a cell phone, a network interface card, an image-based scanner, a laser-based scanner, an RFID reader, a cordless phone, a wireless speaker, a microwave oven and a rogue access point.

3. The method according to claim 1, wherein the bandwidth includes one of a 2.4 and a 5 GHz band.

4. The method according to claim 1, wherein the signal processing technique includes a Fast Fourier Transform.

5. The method according to claim 1, wherein the processing step further includes the following substep:

dividing the signal into a predetermined number of bins having a predetermined resolution, each bin including a portion of the signal corresponding to one subsignal of the plurality of subsignals.

6. The method according to claim 5, wherein the resolution is the bandwidth divided by the number.

7. The method according to claim 1, wherein the first determining step includes the following substep:

determining an amplitude of the particular subsignal, the amplitude being indicative of the energy level of the particular subsignal.

8. The method according to claim 1, wherein the predetermined locationing technique is a triangulation.

9. The method according to claim 1, further comprising:

disabling the corresponding wireless device.

10. A system, comprising:

a plurality of wireless devices transmitting signals on multiple different frequencies within a frequency band having a predetermined bandwidth; and an access point receiving the signals as an input signal encompassing multiple activities in the frequency band occurring at the same time from the plurality of wireless devices, the multiple activities being received simultaneously by the access point, the access point and processing the input signal to generate a plurality of subsignals using a predetermined signal processing procedure, the access point determining an energy level of a particular subsignal of the plurality of subsignals and identifying a signal signature of the particular subsignal, the signal signature being indicative of a corresponding wireless device;

wherein the access point is configured to communicate to a subset of the plurality of wireless devices through a wireless communication protocol and further configured to receive the frequency band in addition to communicating to the subset, the subset comprising wireless local area network devices;

wherein the access point identifies a signal signature of the particular subsignal, the signal signature indicative of the corresponding wireless device of a local area network, wherein responsive to the access point identifying the signal signature of a wireless local area network mobile unit, the access point is configured to demodulate the signal to determine a source and a destination associated with the signal and to determine whether the source and the destination each comprise authorized devices, and wherein the access point determines a location of the corresponding wireless device as a function of the energy level and a predetermined locationing procedure only when the energy level is greater than a predetermined threshold level corresponding to a predetermined network condition.

11. The system according to claim 10 wherein the corresponding wireless device includes one of a cell phone, a network interface card, an image-based scanner, a laser-based scanner, an RFID reader, a cordless phone, a wireless speaker, a microwave oven and a rogue access point.

12. The system according to claim 10, wherein the bandwidth includes one of a 2.4 GHz band and a 5 GHz band.

13. The system according to claim 10, wherein the signal processing technique includes a Fast Fourier Transform.

14. The system according to claim 10, wherein the predetermined locationing technique is a triangulation.

15. A computing arrangement, comprising:

a communication arrangement receiving a signal encompassing multiple activities occurring at the same time from a plurality of wireless devices operating on multiple different frequencies within a frequency band having a predetermined bandwidth, the multiple activities being received simultaneously by the wireless access point;

the communication arrangement further communicating over a channel through a wireless communication protocol to a subset of the plurality of wireless devices comprising wireless local area network devices; and a processor processing the signal to generate a plurality of subsignals using a predetermined signal processing procedure, wherein, the processor determines an energy level of a particular subsignal of the plurality of subsignals, wherein, the processor identifies a signal signature of the particular subsignal, the signal signature being indicative of a corresponding wireless device of a local area network, wherein responsive to the processor identifying the signal signature of a wireless local area network mobile unit, the processor is configured to demodulate the signal to determine a source and a destination associated with the signal and to determine whether the source and the destination each comprise authorized devices, and wherein, the processor determines a location of a corresponding wireless device as a function of the energy level and a predetermined locationing procedure only when the energy level is greater than a predetermined threshold level corresponding to a predetermined network condition.

16. The arrangement according to claim 15, wherein the bandwidth includes one of a 2.4 GHz band and a 5 GHz band.

17. The arrangement according to claim 15, wherein the signal processing technique includes a Fast Fourier Transform.

18. The arrangement according to claim 15, wherein the processor identifies a signal signature of the particular sub-signal, the signal signature indicative of the corresponding wireless device.

19. The method according to claim 1, wherein the wireless access point comprises a first wireless access point, and the method further comprising:
    providing a second wireless access point and a third wireless access point, wherein each of the second wireless access point and a third wireless access point are configured to communicate to a plurality of mobile units through a wireless communication protocol and further configured to receive a frequency band in addition to communicating to the plurality of mobile units; and
    utilizing triangulation as the predetermined locationing technique based on signals detected by each of the first wireless access point, the second wireless access point, and the third wireless access point.

* * * * *